United States Patent [19]

Shimizu et al.

[11] 4,360,566

[45] Nov. 23, 1982

[54] CURABLE ORGANOPOLYSILOXANE COMPOSITION FOR HEAT FIXING ROLLS

[75] Inventors: Kōji Shimizu; Toshio Watanabe, both of Ichihara; Mitsuo Hamada, Kisaratsu, all of Japan

[73] Assignee: Toray Silicone Co., Ltd., Tokyo, Japan

[21] Appl. No.: 345,857

[22] Filed: Feb. 4, 1982

[30] Foreign Application Priority Data

Mar. 5, 1981 [JP]  Japan ................................. 56-31778

[51] Int. Cl.³ ...................... B32B 15/08; B21B 31/08; B32B 5/16
[52] U.S. Cl. ...................................... 428/404; 29/132; 118/60; 219/469; 428/447; 428/450; 428/405; 432/60
[58] Field of Search ............... 428/447, 405, 450, 404; 29/132; 118/60; 432/60; 219/469

[56] References Cited

U.S. PATENT DOCUMENTS

| | | | |
|---|---|---|---|
| 3,669,706 | 6/1972 | Sanders | 219/216 |
| 3,669,707 | 6/1972 | Donnelly | 427/444 |
| 3,795,033 | 3/1974 | Donnelly | 29/132 |
| 3,997,691 | 12/1976 | Murphy | 428/447 |
| 4,000,339 | 12/1976 | Murphy | 428/447 |
| 4,011,362 | 3/1977 | Stewart | 428/447 |
| 4,019,024 | 4/1977 | Namiki | 219/216 |
| 4,057,596 | 11/1977 | Takamizawa | 528/15 |
| 4,064,313 | 12/1977 | Takiguchi | 428/447 |
| 4,074,001 | 2/1978 | Imai | 428/447 |
| 4,075,390 | 2/1978 | Murphy | 428/447 |
| 4,078,286 | 3/1978 | Takiguichi | 29/132 |
| 4,099,312 | 7/1978 | Hill | 29/132 |
| 4,101,686 | 7/1978 | Strella | 428/447 |
| 4,125,362 | 11/1978 | Matsui | 29/132 |
| 4,126,722 | 11/1978 | Murphy | 428/447 |
| 4,188,423 | 2/1980 | Swift | 428/447 |
| 4,245,079 | 1/1981 | Matsumoto | 428/447 |
| 4,248,751 | 2/1981 | Willing | 428/447 |
| 4,254,733 | 3/1981 | Namiki | 118/60 |

*Primary Examiner*—Ellis P. Robinson
*Attorney, Agent, or Firm*—Roger H. Borrousch

[57] ABSTRACT

Heat fixing rolls for electrophotographic dry toner processes are made with a silicone rubber outer layer which contains substantial amounts of siliceous filler, including reinforcing silica filler. The heat fixing rolls produce an increased number of copies before offset occurs.

2 Claims, No Drawings

CURABLE ORGANOPOLYSILOXANE COMPOSITION FOR HEAT FIXING ROLLS

BACKGROUND OF THE INVENTION

1. Field of the Invention

The present invention relates to heat fixing rolls having an improved outer layer of silicone rubber. The heat fixing rolls are used to fix images using dry electrophotographic toner powder by the application of heat and pressure. More specifically, the outer layer of the heat fixing roll can be made by continuous injection molding without a mold release agent, and the resulting heat fixing roll does not require impregnation with silicone oil to significantly increase the number of copies until offset.

2. Description of the Prior Art

The technique for fixing toner powder images which are transferred from a transfer drum onto a backing of paper by the dry electrophotographic process are well known. The method of fixing the toner powder image by pressure on the paper backing with a heated rubber roll, including a silicone rubber roll, is also well known.

Silicone rubber outer layer for the heat fixing rubber roll is well known. Heat curable silicone rubber crosslinked with an organic peroxide has been used to make heat fixing rolls as shown by Japanese Patent Publication No. Sho 36[1961]-1277 and Japanese Patent Publication No. Sho 54[1979]-159,485, published Dec. 17, 1979 and assigned to Showa Gum KK. However, such heat-curable silicone rubber has major drawbacks in terms of manufacturability: numerous kneading operations with double rolls are required because unvulcanized rubber is not sufficiently fluid, numerous manual operations are required because one must depend on winding steam molding or press molding as molding methods, and a continuous operation is impossible in the manufacturing process of the rolls. In addition, this type of silicone rubber has the drawback that secondary vulcanization is necessary in order to prevent the thermal decomposition phenomenon due to the decomposition products of organic peroxides, and post-molding polishing is required due to the use of winding steam vulcanization or press molding. Consequently, it is extremely disadvantageous in terms of manufacturability and production costs. Room temperature vulcanizable silicone rubber has also been used to make heat fixing rolls as shown by U.S. Pat. No. 4,074,001, issued Feb. 14, 1978 to K. Imai et al., and Japanese Patent Publication No. Sho 55[1980]-75,446, published June 6, 1980 and assigned to Tokyo Shibaura Electric Ltd., and Showa Electric Wire K.K. On the other hand, the room temperature-vulcanizable silicone rubber has the advantage that it is a liquid, but its manufacturability is markedly inferior because the cure time is extremely long, such as from several hours to several days. In addition, it also has such drawbacks as the fact that bumping of by-products is necessary because of the condensation reaction.

Aside from the above-mentioned drawbacks, with heat fixing rollers molded with heat-curable silicone rubber or room temperature-vulcanizable silicone rubber, even if compounded with or impregnated with silicone oil, the number of copies until offset is at best 30,000 to 50,000, and the industry strongly desires a further extension of this copy life, i.e., to increase the number of copies before the heat fixing roll expires.

Many types of silicone rubber compositions have been used to manufacture heat fixing rolls, but, because the outer layer demands certain characteristics, and because the outer layer can determine the copy life of the heat fixing roll, the compositions used to make this outer layer of silicone rubber have been well studied in an attempt to increase the copy life. Silicone rubber conventionally is made from compositions which contain fillers, especially reinforcing silica fillers, to improve their physical properties. The reinforcing silica fillers are added to improve the mechanical properties of the silicone rubber, namely the physical strength such as tensile strength. However, the presence of fillers, especially siliceous fillers, has been found to produce undesirable surface properties for heat fixing rolls.

Sanders et al. in U.S. Pat. No. 3,669,706, issued June 13, 1972, teach the undesirability of fillers conventionally used in silicone rubber compositions. Sanders et al. teach that fillers produce a ghost or offset image, especially reinforcing silica filler.

Donnelly et al. in U.S. Pat. No. 3,669,707, issued June 13, 1972, teach the undesirability of fillers, specifically high surface energy fillers such as silica, titanium oxide, and iron oxide. Donnelly et al. teach that silicone elastomer fuser blankets made from compositions containing 20 weight percent silica produce only 1000 copies before objectionable offset occurs and the blanket becomes useless. Also taught is that silicone elastomers which contain less than one weight percent reinforcing filler can provide 35,000 copies before failure occurs from mechanical breakdown of the elastomer. Donnelly et al. teach that low surface energy fillers, such as polytetrafluoroethylene, can produce in excess of 100,000 copies before offset or mechanical breakdown.

Murphy in U.S. Pat. No. 3,997,691, issued Dec. 14, 1976, teaches that silicone rubber containing fillers which release water can be used in amounts up to about 5.0 weight percent based on the weight of the silicone rubber or gum. Murphy teaches that silicone rubber containing 5 weight percent colloidal silica can be used to make fuser blankets if his method is used to fix the toner. At 5 weight percent colloidal silica, at least 11,500 copies were made before offset occurred.

Imai et al. in U.S. Pat. No. 4,074,001, issued Feb. 14, 1978, teach using a room temperature-vulcanizing silicone rubber composition for making fixing rolls. This silicone rubber composition contains silanol terminated diorganopolysiloxane, trialkylsilyl terminated diorganopolysiloxane of low viscosity, an alkoxysilane, a metal salt of an organic acid, and a filler mixture of calcium carbonate, iron oxide, and titanium oxide. Imai et al. teach that these compositions contain substantially no siliceous filler. Imai et al. have discovered an inorganic filler mixture which can be used in silicone rubber for fixing rolls, but specifically excludes siliceous fillers. Imai et al. do teach the use of silicone oil, the trialkylsilyl terminated diorganopolysiloxane, in their room temperature-vulcanizable silicone rubber.

Murphy in U.S. Pat. No. 4,126,722, issued Nov. 21, 1978, teaches that a silicone rubber composition containing benzoic acid and some silica can be used to make the outer layer of silicone rubber for heat fixing rolls. Murphy teaches in this patent that 8 parts by weight silica filler per 100 parts by weight siloxane reduces the number of copies from 80,000 to 70,000 before offset occurred compared to no silica filler. Murphy also teaches reducing the silica filler to 3 parts by weight can increase the number of copies up to 200,000 before offset occurs.

Matsui et al. in U.S. Pat. No. 4,125,362, issued Nov. 14, 1978, teach that RTV silicone rubbers which contain from 25 to 35 weight percent non-reactive dimethyl silicone oil can produce more copies before the offset phenomenon or sheet sticking phenomenon are observed. The RTV silicone rubber contains fumed silica, diatomaceous earth, and ground quartz filler. The RTV silicone rubbers containing 25 to 35 weight percent non-reactive silicone oil produce no less than 20,000 copies before the offset and sticking phenomenon are observed, whereas RTV silicone rubber containing more or less of the silicone oil than the 25 to 35 weight percent produce only between 5,000 and 10,000 copies before one of the phenomenon is observed.

Other patents relating to heat fixing rolls using silicone rubber outer layer and also discussing the use of fillers therein include U.S. Pat. No. 3,795,033, issued Mar. 5, 1974, to Donnelly et al. and U.S. Pat. No. 4,075,390, issued Feb. 21, 1978, to Murphy.

Namiki in U.S. Pat. No. 4,019,024, issued Apr. 19, 1977, teaches room temperature-vulcanizable silicone rubber containing 4 to 40% silicone oil of low viscosity to make the periphery layer of silicone rubber. Namiki also teaches that silicone rubber has poor adhesiveness to the core material and the core surface is preferably primed with a silicone varnish, silane coupling agent, or a silicone rubber.

Takamizawa et al. in U.S. Pat. No. 4,057,596, issued Nov. 8, 1977, teach silicone rubber compositions suggested as useful coating technology in which the techniques of offset printing are used because the compositions have low viscosities, such as below 10,000 centistokes (0.01 m²/s). These compositions are described as comprising vinyldimethylsilyl terminated diorganopolysiloxane, a hydrogendimethylsilyl terminated diorganopolysiloxane, a methylvinylpolysiloxane having at least three vinyl groups, a methylhydrogenpolysiloxane having at least three hydrogen atoms bonded directly to the silicon atoms, a catalyst for the addition of silicon-bonded vinyl groups and silicon-bonded hydrogen atoms. The catalyst includes platinum catalyst. Also the use of retarding agents for platinum catalysts is described as optional.

Takiguchi et al. in U.S. Pat. No. 4,064,313, issued Dec. 20, 1977, teach adhering the silicone rubber outer layer to the base member (core substrate) by using a novel polysiloxane composition. Primers for adhering the outer layer to core substrates are also taught by Takiguichi et al. in U.S. Pat. No. 4,078,286, which patent also identifies silicone rubbers at RTV, LTV, or HTV types.

Other patents which describe heat fixing rolls with a silicone rubber outer layer include U.S. Pat. No. 4,099,312, issued July 11, 1978, to Hill et al.; U.S. Pat. No. 4,188,423, issued Feb. 12, 1980, to Swift; and U.S. Pat. No. 4,254,733, issued Mar. 10, 1981, to Namiki.

SUMMARY OF THE INVENTION

As a result of intensive research to improve the above-mentioned drawbacks, the present inventors arrived at a curable organopolysiloxane composition for heat fixing rolls which has the oustanding advantage that it can be continuously manufactured by injection molding because the cure time when molding the rollers is extremely short, just a few seconds to a few minutes; which does not need polishing the roll after molding; which does not require impregnation of the roll in silicone oil; and with which, when used as a heat fixing roll, the number of copies until offset can significantly be increased to 90,000 to 130,000 copies.

The present invention relates to a heat fixing roll for pressure fusing electrophotographic dry toner powder comprising a core roll substrate with an outer layer of silicone rubber, optionally having a priming layer adhering the silicone rubber to the core roll substrate, wherein the improvement comprising the outer layer of silicone rubber which is a silicone rubber containing substantial amounts of siliceous filler, said silicone rubber being the cured product of a composition consisting essentially of (A) 100 parts by weight of a polyorganosiloxane expressed by the average unit formula

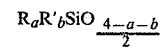

$$R_a R'_b SiO_{\frac{4-a-b}{2}}$$

wherein R is a monovalent radical selected from the group consisting of an alkyl radical of 1 to 8 inclusive carbon atoms, phenyl radical, and 3,3,3-trifluoropropyl radical, R' is an aliphatically unsaturated hydrocarbon radical selected from the group consisting of vinyl radical and allyl radical, a has a value of 1.90 to 2.05, b has a value of 0.0005 to 0.1, and the sum of a+b has a value of 1.91 to 2.06, and the polyorganosiloxane having a viscosity at 25° C. in the range of from 0.1 to 100 Pa·s; (B) an amount of a polyorganohydrogensiloxane sufficient to provide 0.5 to 10 silicon-bonded hydrogen atoms per aliphatically unsaturated hydrocarbon radical in (A), the polyorganohydrogensiloxane being expressed by the average unit formula

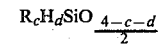

$$R_c H_d SiO_{\frac{4-c-d}{2}}$$

wherein R is as defined above, c has a value of 1.0 to 2.1, d has a value of 0.001 to 1.0, and the sum of c+d has a value of 1.001 to 3, and the polyorganohydrogensiloxane having a viscosity at 25° C. in the range of 0.001 to 5 Pa·s; (C) 50 to 250 parts by weight of a siliceous filler of which at least 10 parts by weight is a reinforcing silica filler, said siliceous filler being surface treated; (D) 0 to 100 parts by weight of a triorganosiloxy end-blocked polydiorganosiloxane in which the organic radicals are the same as defined for R and the polydiorganosiloxane has a viscosity at 25° C. in the range of from 0.01 to 5 Pa·s; (E) an amount of a platinum group catalyst sufficient to provide from 1 to 800 parts by weight platinum group metal per one million parts by weight of the total weight of (A), (B), (C), and (D); and (F) optionally a platinum group catalyst retardant, where the composition has a viscosity at 25° C. in the range of 2 to 10,000 Pa·s.

The polyorganosiloxane of (A) can be expressed by the average unit formula

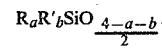

$$R_a R'_b SiO_{\frac{4-a-b}{2}}$$

wherein R is an alkyl radical of 1 to 8 carbon atoms, such as methyl, ethyl, propyl, butyl, and octyl; phenyl radical; or 3,3,3-trifluoropropyl radical; R' is vinyl radical or allyl radical; a has a value of 1.90 to 2.05; b has a value of 0.0005 to 0.1; and the sum of a+b has a value of 1.91 to 2.06.

This polyorganosiloxane is normally a straight chain, but there can be a few branches. The aliphatic unsaturated hydrocarbon radical can be at the chain ends or pendent on the chain, or it can be present at both locations, but in terms of the silicone rubber's mechanical properties after curing, it is desirable that it be present at least at both ends. In each molecule, R can be one type of radical. There may be only one R group in each molecule, or a mixture of two or more varieties. In (A), there can also be only one variety of polyorganosiloxane, or there can be a mixture of two or more varieties. The hardness of the silicone rubber after curing can be varied by the amount of inorganic filler present and by the cross-linking density which can be varied by mixing together polyorganosiloxanes with a comparatively low viscosity and polyorganosiloxanes with a comparatively high viscosity, so that one can easily obtain the hardness sought. The viscosity at 25° C. of the polyorganosiloxane, irrespective of the invididual constituents or mixtures, can be in the range of 0.1 to 100 Pa·s, but is preferably in the range of 0.2 to 50 Pa·s from the standpoint of optimum operability for injection molding.

The preferred polyorganosiloxanes of (A) are dimethylvinylsiloxy endblocked polydimethylsiloxane having a viscosity at 25° C. in the range of 0.1 to 50 Pa·s. The polyorganosiloxane of (A) is crosslinked by the polyorganohydrogensiloxane of (B) due to the catalytic action of the platinum group catalyst of (E).

The polyorganohydrogensiloxane of (B) can be expressed by the average unit formula

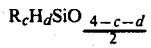

$$R_c H_d SiO_{\frac{4-c-d}{2}}$$

wherein R is the same as defined above, for example, methyl, ethyl, propyl, butyl, octyl, phenyl, or 3,3,3-trifluoropropyl; c has a value of 1.0 to 2.1; d has a value of 0.001 to 1.0 and the sum of c+d has a value of 1.001 to 3; and acts as the cross-linking agent for (A). This polyorganohydrogensiloxane can take the form of a straight chain, branched chain, network, or ring, but preferably is a straight chain or ring. There can be only one variety of R radicals in each molecule, or two or more varieties can be present. Also, the polyorganohydrogensiloxane is not limited to one variety, but can be a mixture of two or more varieties. The position of the hydrogen atom which bonds to the silicone atom can be either at the ends of the molecule or pendent or it can be in both locations, but in order to cure component (A), there must be 0.5 to 10 hydrogen atoms bonded to silicon atoms per each aliphatic unsaturated hydrocarbon radical in (A). The viscosity of (B) at 25° C. is in the range of 0.001 to 5 Pa·s in view of volatility and injection moldability. The preferred polyorganohydrogensiloxanes of (B) are polymethylhydrogensiloxanes.

The siliceous filler of (C) can be a reinforcing silica filler such as fumed silica or precipitated silica, and other siliceous fillers such as fused silica, quartz powder or diatomaceous earth. Mixtures of the siliceous fillers can be used. The siliceous filler should contain at least 10 parts by weight of reinforcing silica filler based on 100 parts by weight of (A). The surface of the siliceous filler is treated with an organosilane, organosilazane, or a silicone oil. The siliceous filler surface can be pretreated before mixing with any of the other components of the composition or it can be treated insitu. Preferably the siliceous filler surface is treated insitu with hexamethyldisilazane. The amount of siliceous filler can be from 50 to 250 parts by weight per 100 parts by weight of (A). Preferably, the siliceous filler is a mixture of 15 to 50 parts by weight of reinforcing silica filler, 40 to 160 parts by weight of quartz powder, and 0 to 60 parts by weight of diatomaceous earth. This mixture being insitu treated with hexamethyldisilazane. The siliceous filler of (C) influences the viscosity and the fluidity of the composition and provides the mechanical strength, hardness, and thermal conductivity of the silicone rubber. Other fillers can be present, such as aluminum silicate, titanium oxide, zinc oxide, iron oxide, alumina, calcium carbonate, zinc carbonate, and carbon black. When the amount of (C) is too small, the original objective is not realized, and when excessive amounts are used, the fluidity of the composition becomes poor and the silicone rubber becomes brittle.

The triorganosiloxy endblocked polydiorganosiloxane of (D) is an optional ingredient. The organic radicals of (D) are the same as defined for R above. The polydiorganosiloxane of (D) can have a viscosity at 25° C. in the range of 0.01 to 5 Pa·s, and is preferably trimethylsiloxy endblocked polydimethylsiloxane because of economy and mold separability. When ingredient (D) is used in the composition, it imparts lubricity and mold releasability to the roll surface and also further increases the number of copies before offset is observed. Ingredient (D) is usually termed a silicone oil, and preferably is free of hydroxyl radicals. Examples of (D) are polydimethylsiloxane, polyethylmethylsiloxane, polymethylphenylsiloxane, polydiethylsiloxane, polydiphenylsiloxane, polyethylphenylsiloxane, polymethyl-3,3,3-trifluoropropylsiloxane, polyethyl-3,3,3-trifluoropropylsiloxane, and polyphenyl-3,3,3-trifluoropropylsiloxane. Polymers containing two or more units can be used. Mixtures of different types of polymers can also be used. When the viscosity of (D) is less than 0.01 Pa·s, the polydiorganosiloxane tends to volatilize, and when the viscosity of (D) is above 5 Pa·s, the polydiorganosiloxane does not satisfactorily permeate to the roll surface. The viscosity at 25° C. of (D) is therefore in the range of 0.01 to 5 Pa·s, preferably from 0.05 to 3 Pa·s.

Compositions used to make the outer layer of silicone rubber for heat fixing rolls have outstanding properties without ingredient (D), but by adding (D), the number of copies produced before offset occurs can be increased. (D) is preferably mixed into the composition, when used, thus avoiding any need to impregnate the rolls after molding. The amount of (D) can be from 0 to 100 parts by weight per 100 parts by weight of (A), preferably 10 to 70 parts by weight. Desirably, (D) in the entire composition is in the range of 5 to 20 weight percent.

The platinum group catalyst of (E) is a catalyst for causing an addition reaction between the aliphatic unsaturated hydrocarbon radical of (A) and the hydrogen atoms which bond to the silicon atoms of (B). Examples of these are platinum micropowder, platinum micropowder absorbed on a carbon powder carrier, chloroplatinic acid, alcohol modified materials of chloroplatinic acid, chelated compounds of platinum, coordinated compounds of chloroplatinic acid and olefins, coordinated compounds of chloroplatinic acid and vinylsiloxane, and various metallic compounds of palladium, rhodium, iridium, ruthenium, and osmium. Among these, platinum catalysts are preferable. The amount of platinum group catalyst added is from 1 to 800 ppm as platinum group metal with respect to the total amount of (A), (B), (C), and (D).

The composition of the present invention is manufactured by mixing (A), (B), (C), (D), and (E), or (A), (B), (C), and (E), until uniform. The apparent viscosity of the composition at 25° C. after mixing is in the range of 2 to 10,000 Pa·s at a shear velocity of 5 sec$^{-1}$. The mixer should be one suited to injecting and mixing a powder in a liquid. An apparatus which can stir and mix at a high shear velocity is desirable. The mixing conditions are not particularly restricted, but it is preferable to mix the other components after having dispersed (C) as uniformly as possible in (A). When (A), (B), and (E) are put together, hardening begins immediately, so it is desirable to place these three together just prior to injection molding. It is convenient from the standpoint of handling to add addition reaction retardants, such as organic nitrogen compounds, acetylene compounds such as acetylenic alcohols and tin compounds, to this composition in order to control this curing reaction. In such cases, it is desirable to add the retardants so that the time required for the viscosity (25° C.) of the composition to double is 12 hours or more. Also, antistatic agents, heat resistant agents, flame retardants, pigments, glass fibers, carbon fibers, etc., may be added as needed.

The paste-like composition obtained in this way is poured into a cylindrical metal mold into which the roll core metal, with or without primer, has been inserted, using a screw-type injection molder, plunger-type injection molder, etc. Simply by heating for several seconds to several minutes at 100° to 250° C., it is possible to manufacture a heat fixing roll which does not require polishing. The composition of the present invention is ideal for molding by injection molding, but cast molding, press molding, and other conventional molding methods can be employed. It goes without saying that it is also applicable to the molding of rolls for various uses besides heat fixing rolls.

The following examples are illustrative only and should not be construed as limiting the invention which is properly delineated in the claims. In the examples, "parts" means "parts by weight", and viscosity is the value at 25° C.

EXAMPLES 1-3

As shown in Table I, fumed silica with a surface area of 200 m²/g, quartz powder (average particle size 5μ), diatomaceous earth, and hexamethyldisilazane were added as the siliceous filler of (C) to polydimethylsiloxane with dimethylvinylsiloxy at both ends. Then this mixture was heated and mixed. To this resulting mixture, polymethylhydrogensiloxane expressed by the following formula

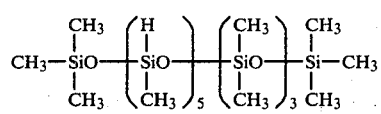

(viscosity 0.007 Pa·s), was added as (B), and a complex salt of methylvinylsiloxane and chloroplatinic acid was added as the addition reaction catalyst of (E) so that the platinum became 15 ppm with respect to (A), (B), and (C). Then 3,5-dimethyl-1-hexyn-3-ol was added as an addition reaction inhibitor and mixed until uniform to make the composition of Examples 1 to 3.

After this composition was de-aired, it was poured using an injection molder into a cylindrical metal mold with a mirror finished internal surface into which the roll core metal, treated with an alkoxysilane silicone primer, had been inserted. It was heat cured for two minutes at a temperature of 150° C., and a roll for heat fixing was obtained. This roll did not require polishing. The characteristics of the roll obtained and of the rubber on the roll are composed as shown in Table II.

As Comparison Example 1, an alcoholated room temperature-vulcanizable silicone rubber composition (SH 9551, manufactured by Toray Silicone Company, Tokyo, Japan) was poured into the above-mentioned cylindrical metal mold into which a roll treated with the above-mentioned primer was inserted and was cured by leaving it alone for one week at room temperature. A roll for heat fixing was obtained.

As Comparison Example 2, 1.5 parts dicumyl peroxide were added per 100 parts heat-vulcanizing silicone rubber composition (SH 746U, manufactured by Toray Silicone Company, Tokyo, Japan) as a vulcanizing agent. This was kneaded until uniform with double rolls, wound on a roll treated with the above-mentioned primer, set in a cylindrical metal mold, and press molded for 20 minutes at 160° C. This was taken out, and after secondary vulcanization for 4 hours at 200° C., was polished, and a heat fixing roll was obtained.

The characteristics of the roll obtained in the comparison examples and of the rubber of which it is composed are shown together in Table II.

TABLE I

| Components (parts) | Examples | | |
|---|---|---|---|
| | 1 | 2 | 3 |
| (a) Polydimethylsiloxane with dimethylvinylsiloxy groups at both ends, | | | |
| viscosity 0.5 Pa · s | 50 | — | — |
| viscosity 2 Pa · s | — | 100 | — |
| viscosity 10 Pa · s | — | — | 100 |
| viscosity 30 Pa · s | 50 | — | — |
| (b) Polymethylhydrogensiloxane, viscosity 0.007 Pa · s | 2.5 | 2.0 | 1.8 |
| (c) Fumed silica filler | 22 | 30 | 20 |
| Quartz powder | 50 | 45 | 50 |
| Diatomaceous earth | — | — | 50 |
| (d) Polydimethylsiloxane with trimethylsiloxy groups at both ends, 0.1 Pa · s | — | — | — |
| (e) Platinum, ppm | 15 | 15 | 15 |
| Hexamethyldisilazane | 5 | 5 | 5 |
| 3,5-dimethyl-1-hexyn-3-ol | 0.1 | 0.05 | 0.1 |

TABLE II

| Characteristics | Examples | | | Comparison Examples | |
|---|---|---|---|---|---|
| | 1 | 2 | 3 | 1 | 2 |
| Apparent viscosity (25° C.) of composition Pa · s (shear velocity 5 sec$^{-1}$) | $3 \times 10^2$ | $4 \times 10^2$ | $3 \times 10^2$ | — | — |
| Hardness (JIS-A) | 55 | 55 | 45 | 45 | 60 |
| Tensile strength (kg/cm²) | 50 | 55 | 46 | 28 | 70 |
| Elongation (%) | 300 | 300 | 320 | 180 | 230 |

TABLE II-continued

| Characteristics | Examples | | | Comparison Examples | |
| --- | --- | --- | --- | --- | --- |
| | 1 | 2 | 3 | 1 | 2 |
| Tear strength (kg/cm) | 10 | 12 | 9 | 3 | 12 |
| Volume resistivity (Ω cm) | $5 \times 10^{15}$ | $5 \times 10^{15}$ | $4 \times 10^{12}$ | $4 \times 10^{14}$ | $4 \times 10^{15}$ |
| Thermal conductivity (cal/cm · sec · °C.) | $5 \times 10^{-4}$ | $5 \times 10^{-4}$ | $6 \times 10^{-4}$ | $5 \times 10^{-4}$ | $5 \times 10^{-4}$ |
| Compression Set* | | | | | |
| Strain at 25% compression (%) | 10.5 | 10.5 | 9.0 | 9.20 | 13.0 |
| Oil resistance** | | | | | |
| Weight change (%) | 16.5 | 22.5 | 20.5 | *** | 28.5 |
| Heat resistance (220° C./96 hr.) | | | | | |
| Elongation retention (%) | 75 | 70 | 65 | — | — |
| Cure rate at time of molding (sec/mm length) | 10 | 7 | 10 | — | — |
| Number of copies until offset | 100,000 | 90,000 | 100,000 | 30,000 | 30,000 |

*Measured after drying 22 hr. in a 180° C. oven after soaking 24 hr. in dimethyl silicone oil (viscosity 0.1 Pa · s) heated to 180° C., according to JIS-K 6301.
**Measured after soaking 500 hr. in dimethyl silicone oil (viscosity 0.1 Pa · s) heated to 180° C.
***Measurement impossible because of dissolving.

EXAMPLES 4–6

Polydimethylsiloxane (30 parts) with trimethylsiloxy units at both ends and a viscosity of 0.1 Pa·s was combined in each composition used in Examples 1–3 and Comparison Examples 1–2. These were made into heat fixing rolls in the same manner as in Examples 1–3 and Comparison Examples 1–2. The results of measurement of the number of copies until offset are shown for each roll in Table III.

TABLE III

| | Composition | Apparent Viscosity (25° C.) of Composition Pa · s (Shear Velocity 5 sec$^{-1}$) | Number of Copies Until Offset |
| --- | --- | --- | --- |
| Examples | | | |
| 4 | Polydimethylsiloxane with trimethylsiloxy units at both ends and having a viscosity of 0.1 Pa · s (30 parts) was mixed in the composition of Example 1 | $1.5 \times 10^2$ | 130,000 |
| 5 | Example 2 (otherwise same as above) | $2 \times 10^2$ | 110,000 |
| 6 | Example 3 (otherwise same as above) | $1.5 \times 10^2$ | 120,000 |
| Comparison Examples | | | |
| 3 | Comparison Example 1 (otherwise same as above) | — | 40,000 |
| 4 | Comparison Example 2 (otherwise same as above) | — | 40,000 |

EXAMPLES 7–9

A mixture of dimethylvinylsiloxy endblocked polydimethylsiloxanes with viscosities of 2 Pa·s (50 parts) and 10 Pa·s (50 parts), fumed silica with a surface area of 200 m²/g (30 parts), quartz powder with an average particle size of 5μ (150 parts) and hexamethyldisilazane (5 parts) were heated and made into a uniform mixture. To this, the polymethylhydrogensiloxane used in Examples 1–3, (1.8 parts), diatomaceous earth (20 parts), 3,5-dimethyl-1-hexyn-3-ol (0.1 part, as addition reaction inhibitors), a complex salt of methylvinylsiloxane and chloroplatinic acid (an amount so that the amount of platinum with respect to (A), (B), and (C) was 15 ppm,) were added and made into a uniform composition (Example 7). Another composition (Example 8) was prepared by mixing polydimethylsiloxane with trimethylsiloxy units at both ends (25 parts) in the previously mentioned composition; still another composition (Example 9) was similarly prepared by mixing 50 parts. A roll for heat fixing was manufactured in the same manner as in Examples 1–3; however, the heat cure was for 2 minutes at 200° C. The characteristics of these rolls and of the rubber of which the rolls were composed are shown in Table IV.

TABLE IV

| Characteristics | Examples | | |
| --- | --- | --- | --- |
| | 7 | 8 | 9 |
| Apparent viscosity (25° C.) of composition Pa · s (shear velocity 5 sec$^{-1}$) | $5 \times 10^2$ | $3 \times 10^2$ | $1 \times 10^2$ |
| Hardness (JIS-A) | 65 | 60 | 54 |
| Tensile strength (kg/cm²) | 60 | 55 | 50 |
| Elongation (%) | 140 | 150 | 150 |
| Tear strength (kg/cm) | 10 | 10 | 9 |
| Volume resistivity (Ω cm) | — | $5 \times 10^{13}$ | — |
| Thermal conductivity cal/cm · sec · °C.) | — | $2 \times 10^{-3}$ | — |
| Compression Set* | | | |
| Strain at 25% compression (%) | 5.0 | 6.5 | 7.5 |
| Oil resistance** | | | |
| Weight change (%) | 18.2 | 11.1 | 9.5 |
| Heat resistance (220° C./96 hr.) | | | |
| Elongation retention (%) | 70 | 65 | 50 |
| Cure rate at time of molding (sec/mm length) | 6 | 6 | 6 |
| Number of copies until offset | 90,000 | 120,000 | 130,000 |

*Measured after drying 22 hr. in a 180° C. oven after soaking 24 hr. in dimethyl silicone oil (viscosity 0.1 Pa · s) heated to 180° C., according to JIS-K 6301.
**Measured after soaking 500 hr. in dimethyl silicone oil (viscosity 0.1 Pa · s heated to 180° C.

That which is claimed is:
1. A heat fixing roll for pressure fusing electrophotographic dry toner powder comprising a core roll substrate with an outer layer of silicone rubber, optionally having a primary layer adhering the silicone rubber to the core roll substrate, wherein the improvement comprising the outer layer of silicone rubber which is a silicone rubber containing substantial amounts of siliceous filler, said silicone rubber being the cured product of a composition consisting essentially of (A) 100 parts by weight of a polyorganosiloxane expressed by the average unit formula $$R_a R'_b SiO_{\frac{4-a-b}{2}}$$

wherein R is a monovalent radical selected from the group consisting of an alkyl radical of 1 to 8 inclusive carbon atoms, phenyl radical, and 3,3,3-trifluoropropyl radical, R' is an aliphatically unsaturated hydrocarbon radical selected from the group consisting of vinyl radical and allyl radical, a has a value of 1.90 to 2.05, b has a value of 0.0005 to 0.1, and the sum of a+b has a value of 1.91 to 2.06, and the polyorganosiloxane having a viscosity at 25° C. in the range of from 0.1 to 100 Pa·s, (B) an amount of a polyorganohydrogensiloxane sufficient to provide 0.5 to 10 silicon-bonded hydrogen atoms per aliphatically unsaturated hydrocarbon radical in (A), the polyorganohydrogensiloxane being expressed by the average unit formula $$R_c H_d SiO_{\frac{4-c-d}{2}}$$

wherein R is as defined above, c has a value of 1.0 to 2.1, d has a value of 0.001 to 1.0, and the sum of c+d has a value of 1.001 to 3, and the polyorganohydrogensiloxane having a viscosity at 25° C. in the range of 0.001 to 5 Pa·s, (C) 50 to 250 parts by weight of a siliceous filler of which at least 10 parts by weight is a reinforcing silica filler, said siliceous filler being surface treated, (D) 0 to 100 parts by weight of a triorganosiloxy endblocked polydiorganosiloxane in which the organic radicals are the same as defined for R and the polydiorganosiloxane has a viscosity at 25° C. in the range of from 0.01 to 5 Pa·s, (E) an amount of a platinum group catalyst sufficient to provide from 1 to 800 parts by weight platinum group metal per one million parts by weight of the total weight of (A), (B), (C), and (D), and (F) optionally a platinum group catalyst retardant, where the composition has a viscosity at 25° C. in the range of 2 to 10,000 Pa·s.

2. The heat fixing roll according to claim 1 in which the polyorganosiloxane of (A) is a dimethylvinylsiloxy endblocked polydimethylsiloxane having a viscosity in the range of 0.1 to 50 Pa·s, the polyorganohydrogensiloxane of (B) is a polymethylhydrogensiloxane, the siliceous filler of (C) is a mixture of 15 to 50 parts by weight reinforcing silica, 40 to 160 parts by weight quartz filler, and 0 to 60 parts by weight diatomaceous earth, said siliceous filler being insitu treated with hexamethyldisilazane, the polydiorganosiloxane (D) is a trimethylsiloxy endblocked polydimethylsiloxane, the platinum group catalyst of (E) is a platinum catalyst, and the retardant of (F) is an acetylenic alcohol.

* * * * *